(12) United States Patent
Oohara et al.

(10) Patent No.: US 7,174,072 B2
(45) Date of Patent: Feb. 6, 2007

(54) OPTICAL DEVICE HAVING OPTICAL WAVEGUIDE AND METHOD FOR MANUFACTURING THE SAME

(75) Inventors: Junji Oohara, Nisshin (JP); Shinji Yoshihara, Nagoya (JP); Yukihiro Takeuchi, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 63 days.

(21) Appl. No.: 11/139,540

(22) Filed: May 31, 2005

(65) Prior Publication Data

US 2005/0265662 A1    Dec. 1, 2005

(30) Foreign Application Priority Data

Jun. 1, 2004    (JP) .............................. 2004-163628

(51) Int. Cl.
*G02B 6/26* (2006.01)
*H01L 21/00* (2006.01)

(52) U.S. Cl. .................. 385/43; 385/146; 385/147; 438/29; 438/31; 438/700; 438/701

(58) Field of Classification Search .................. 385/15, 385/31, 32, 33, 43, 39, 147, 146, 900, 901; 438/29, 30, 31, 32, 700, 701
See application file for complete search history.

(56) References Cited

U.S. PATENT DOCUMENTS

| | | | |
|---|---|---|---|
| 5,914,760 A * | 6/1999 | Daiku ........................ 349/65 |
| 6,277,756 B1 | 8/2001 | Ohara et al. ................. 438/700 |
| 6,630,389 B2 | 10/2003 | Shibata et al. .............. 438/424 |
| 6,757,106 B2 * | 6/2004 | Kusuyama ................... 359/619 |
| 6,995,907 B2 * | 2/2006 | Osawa et al. ............... 359/460 |
| 2005/0002605 A1 * | 1/2005 | Sakai et al. ................... 385/27 |
| 2005/0265662 A1 * | 12/2005 | Oohara et al. ................. 385/43 |

FOREIGN PATENT DOCUMENTS

JP    A-2002-341166    11/2002    ............. 385/146 X

* cited by examiner

Primary Examiner—Brian M. Healy
(74) Attorney, Agent, or Firm—Posz Law Group, PLC

(57) ABSTRACT

An optical device includes: a silicon substrate; a plurality of silicon oxide columns having a rectangular plan shape; and a cavity disposed between the columns. Each column has a lower portion disposed on the substrate. Each column has a width defined as W1. The cavity has a width defined as W2. A ratio of W1/W2 becomes smaller as it goes to the lower portion of the column. A core layer provided by the columns and the cavity can have the thickness equal to or larger than a few dozen μm easily. Therefore, connection loss between a light source and the device is reduced.

27 Claims, 16 Drawing Sheets

OPTICAL DEVICE HAVING OPTICAL WAVEGUIDE AND METHOD FOR MANUFACTURING THE SAME

CROSS REFERENCE TO RELATED APPLICATION

This application is based on Japanese Patent Application No. 2004-163628 filed on Jun. 1, 2004, the disclosure of which is incorporated herein by reference.

FIELD OF THE INVENTION

The present invention relates to an optical device having an optical waveguide and a method for manufacturing an optical device having an optical waveguide.

BACKGROUND OF THE INVENTION

An optical waveguide is formed on a substrate such as silicon substrate to have a predetermined shape for transmitting light wave in the waveguide. Therefore, the waveguide is similar to an electric wiring for flowing current. The waveguide is provided by an optical device. The device includes a silicon substrate, a cladding layer on the substrate, and a core layer as an optical waveguide. The core layer is disposed on the substrate through the cladding layer. The cladding layer has low refraction index, and the core layer has high refraction index.

The core layer is made of $SiO_2$ having high refraction index, and the cladding layer is made of $SiO_2$ having low refraction index. The deposition of a $SiO_2$ layer as the core layer has a limitation so that the thickness of the $SiO_2$ layer is limited. Therefore, connection loss at a connection between the waveguide and an optical source becomes larger.

SUMMARY OF THE INVENTION

In view of the above-described problem, it is an object of the present invention to provide an optical device having an optical waveguide with low connection loss of light.

It is another object of the present invention to provide a method for manufacturing an optical device having an optical waveguide with low connection loss of light.

An optical device includes: a silicon substrate; a plurality of silicon oxide columns having a rectangular plan shape; and a cavity disposed between the columns. Each column has a lower portion disposed on the substrate. Each column has a width defined as W1. The cavity has a width defined as W2. A ratio of W1/W2 becomes smaller as it goes to the lower portion of the column.

In the above device, an average refraction index in the column becomes larger as it goes to a top of the column so that the light is trapped effectively in the device. Further, the height of the column can be increased so that connection loss of light between the device and a light source is reduced.

Preferably, the columns and the cavity provide an optical waveguide for transmitting light therethrough, and the optical waveguide has a maximum average refraction index and a minimum average refraction index so that a difference between the maximum average refraction index and the minimum average refraction index is equal to or larger than 4% of the maximum average refraction index. More preferably, the optical waveguide transmits light in a light transmitting direction. The columns extend in the light transmitting direction, and the cavity extends in the light transmitting direction. More preferably, the cavity is disposed inside of the optical waveguide so that the cavity is surrounded with the substrate, the columns and the silicon oxide wall.

Preferably, the device further includes a second cavity disposed between the columns. The cavity is disposed in the lower portion of the columns. The second cavity is disposed in an upper portion of the columns. The width defined as W1 is a width of the lower portion of the column. Each column has a second width of the upper portion defined as W3. The second cavity has a width defined as W4, and a ratio of W3/W4 becomes smaller as it goes to the upper portion of the column. More preferably, each column has a middle portion. The middle portions of the columns are connected. The cavity is disposed below the middle portions of the columns. The second cavity is disposed above the middle portions of the columns. The width of the cavity becomes larger as it goes to the lower portion of the column, and the second cavity has a second width, which becomes larger as it goes to the upper portion of the column. More preferably, the cavity has a triangular cross section so that the width of the cavity becomes larger as it goes to the lower portion of the column, and the second cavity has an inverted triangular cross section so that the second width of the second cavity becomes larger as it goes to the upper portion of the column.

Further, a method for manufacturing an optical device includes the steps of: forming a plurality of trenches on a surface of a silicon substrate by a trench etching method in such a manner that each trench has a width, which becomes larger as it goes to an opposite surface of the substrate, wherein the opposite surface of the substrate is opposite to the surface of the substrate; and thermally oxidizing the silicon substrate so that the trenches are embedded with silicon oxide, and that a silicon layer disposed between two neighboring trenches is converted to a silicon oxide layer. In the step of thermally oxidizing the silicon substrate, the silicon oxide layer provides a silicon oxide column having a lower portion connected to the substrate. In the step of thermally oxidizing the silicon substrate, a cavity is formed between two neighboring columns in the lower portion of the column. The cavity has a width, which becomes larger as it goes to the lower portion of the column.

The above method provides the device, in which an average refraction index in the column becomes larger as it goes to a top of the column so that the light is trapped effectively in the device. Further, the height of the column can be increased so that connection loss of light between the device and a light source is reduced.

Further, a method for manufacturing an optical device includes the steps of: forming a plurality of trenches on a surface of a silicon substrate by a trench etching method in such a manner that each trench has a minimum width and a maximum width, wherein the minimum width of the trench is provided at a middle portion of the trench, and the maximum width of the trench is provided at a bottom of the trench and provided at a top of the trench; and thermally oxidizing the silicon substrate so that the trenches are embedded with silicon oxide, and that a silicon layer disposed between two neighboring trenches is converted to a silicon oxide layer. In the step of thermally oxidizing the silicon substrate, the silicon oxide layer provides a silicon oxide column having a lower portion connected to the substrate. In the step of thermally oxidizing the silicon substrate, a first cavity is formed between two neighboring columns in the lower portion of the trench, and a second cavity is formed between two neighboring columns in an upper portion of the trench. The first cavity has a first width, which becomes larger as it goes to the bottom of the trench, and the second cavity has a second width, which becomes larger as it goes to the top of the trench.

The above method provides the device, in which an average refraction index in the column becomes smaller as it goes to a top or a bottom of the column so that the light is trapped effectively in the device. Further, the height of the column can be increased so that connection loss of light between the device and a light source is reduced.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 15:
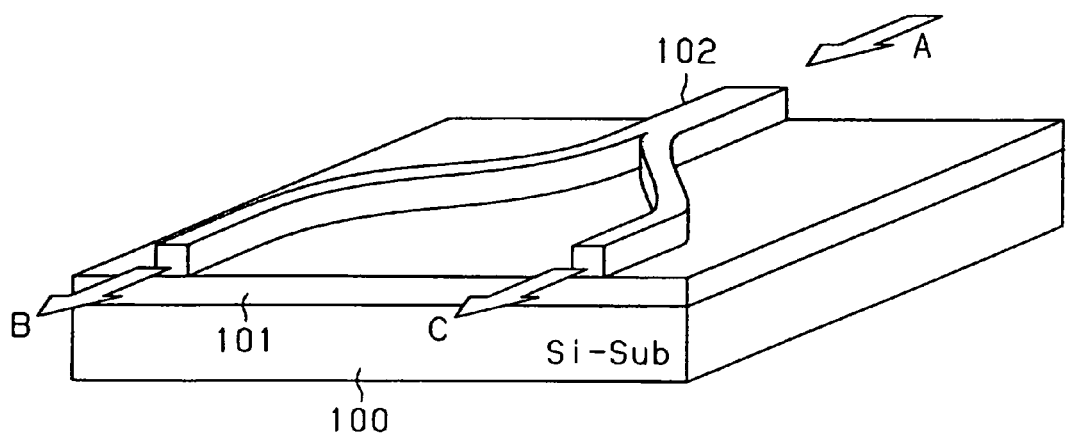
FIG. 15 is a schematic perspective view showing an optical device according to a comparison of the first embodiment.

The inventors have preliminarily studied about an optical device having an optical waveguide. FIG. 15 shows the waveguide as an example. The device includes a silicon substrate 100, a cladding layer 101 on the substrate 100, and a core layer 102 as an optical waveguide. The core layer 102 is disposed on the substrate 100 through the cladding layer 101. The core layer 102 is formed to have a predetermined pattern. In the device, a light wave is introduced from A-direction into the core layer 102, and then, the light wave is divided into two directions. Then, two light waves are outputted toward B- and C-directions.

Further, the device includes a passive element such as a prism and an optical filter and a positive element such as a semiconductor laser so that a planer light wave circuit (i.e., PCL) including an electric integrated circuit is formed.

Here, the optical device having the waveguide is similar to an optical fiber on a substrate. Therefore, two different types of quartz layers (i.e., $SiO_2$ layers) having different refraction indexes are formed on the substrate so that the cladding layer 101 and the core layer 102 are formed. The cladding layer 101 has low refraction index, and the core layer 102 has high refraction index.

In a conventional method, a $SiO_2$ layer is deposited on a substrate by a CVD method. Then, the $SiO_2$ layer is etched to have a predetermined pattern. For example, as shown in FIGS. 16A to 17D, the silicon substrate 100 is prepared. Then, a $SiO_2$ layer 110 is deposited on the substrate 100 by the CVD method. The $SiO_2$ layer 110 has low refraction index. Then, another $SiO_2$ layer 111 having high refraction index is deposited on the substrate 100. After that, a mask 112 for etching the $SiO_2$ layer 111 is formed on the $SiO_2$ layer 111. The mask 112 is made of, for example, chrome (i.e., Cr) film. The mask 112 is formed to have a predetermined pattern by a photolithography method. Then, the $SiO_2$ layer 111 is etched by using the mask 112. Thus, the $SiO_2$ as the core layer 102 is formed. The optical waveguide having minimum functions is provided. The light wave introduced into the $SiO_2$ layer 111 as the core layer 102 is trapped in the $SiO_2$ layer 111, which is surrounded by the $SiO_2$ layer 110 and air in a vertical direction. The $SiO_2$ layer 110 and the air have low refraction indexes lower than that of the $SiO_2$ layer 111 as the core layer 102. Further, the $SiO_2$ layer 111 is surrounded by the air having low refraction index. Therefore, the light wave is trapped in and transmitted through the $SiO_2$ layer 111. Further, after the mask 112 is removed, another $SiO_2$ layer as an upper cladding layer 113 having low refraction index is deposited on the substrate 100. The $SiO_2$ layer 113 protects the core layer 102.

However, the deposition of the $SiO_2$ layer 111 as the core layer 102 has a limitation so that the thickness of the $SiO_2$ layer 111 is limited. Therefore, connection loss at a connection between the waveguide and an optical source becomes larger.

Figure 1:
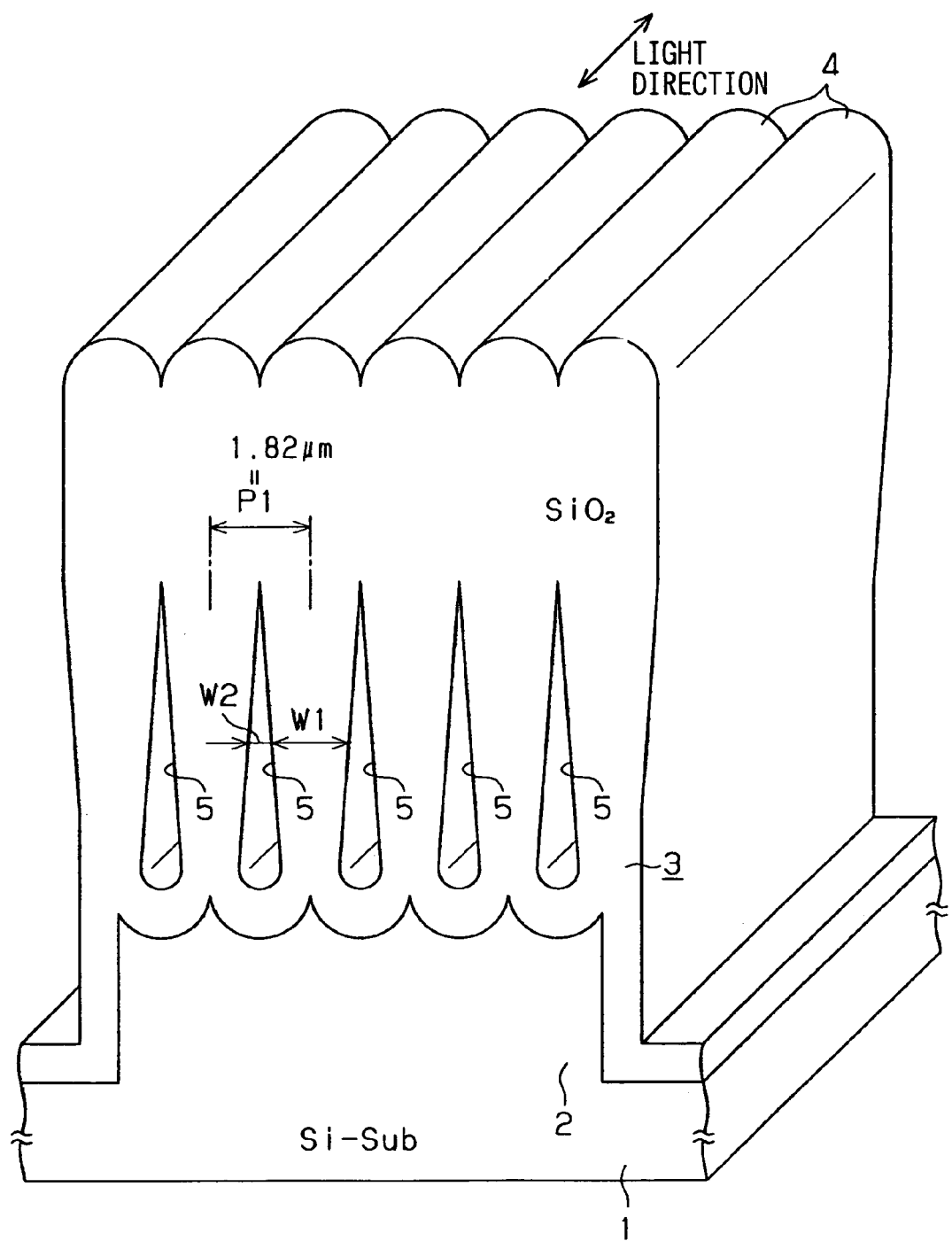
FIG. 1 is a schematic perspective view showing an optical device according to a first embodiment of the present invention.
Figure 2A:
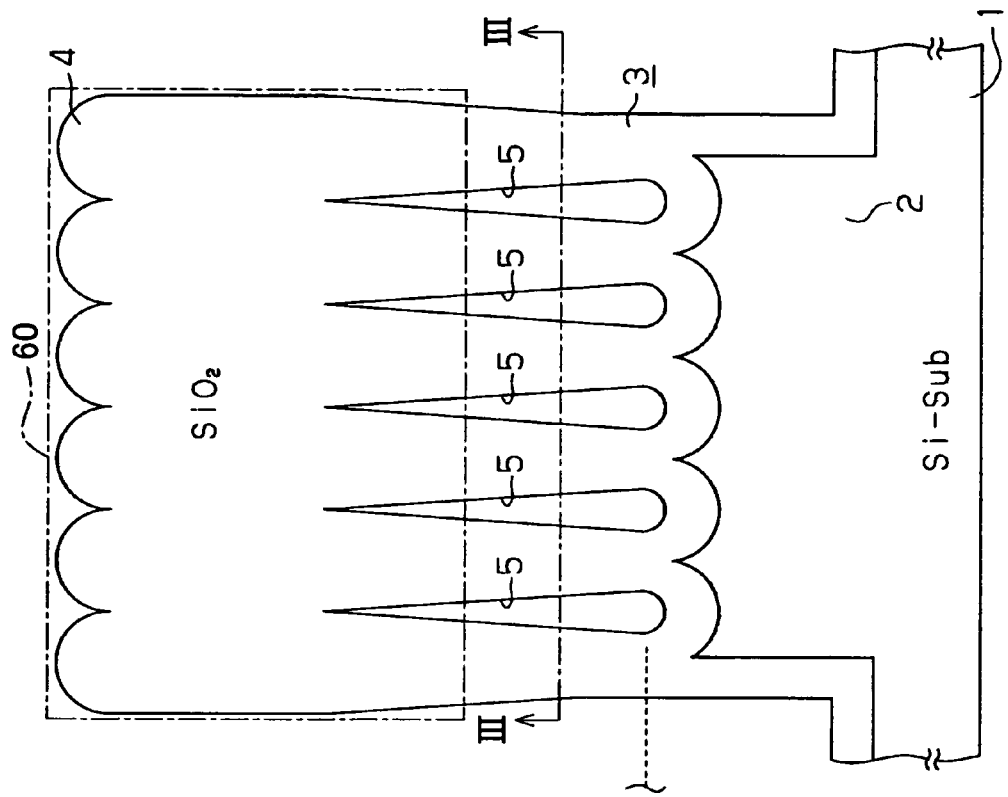
FIG. 2A is a cross sectional view showing the device.
Figure 2B:
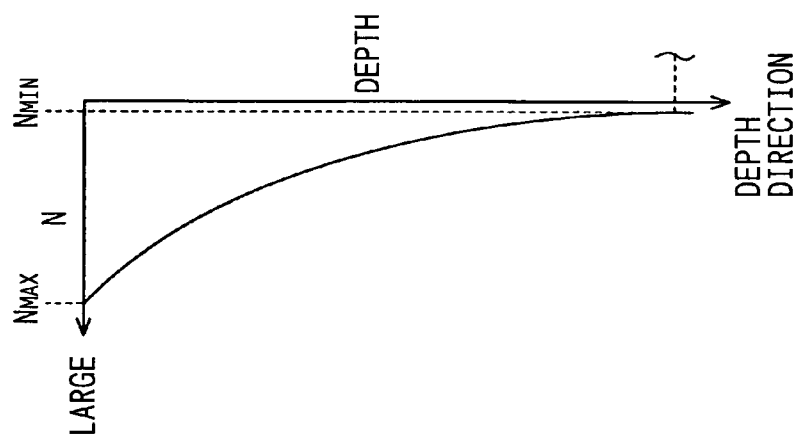
FIG. 2B is a graph showing a depth profile of an average refraction index in the device according to the first embodiment.
Figure 3:
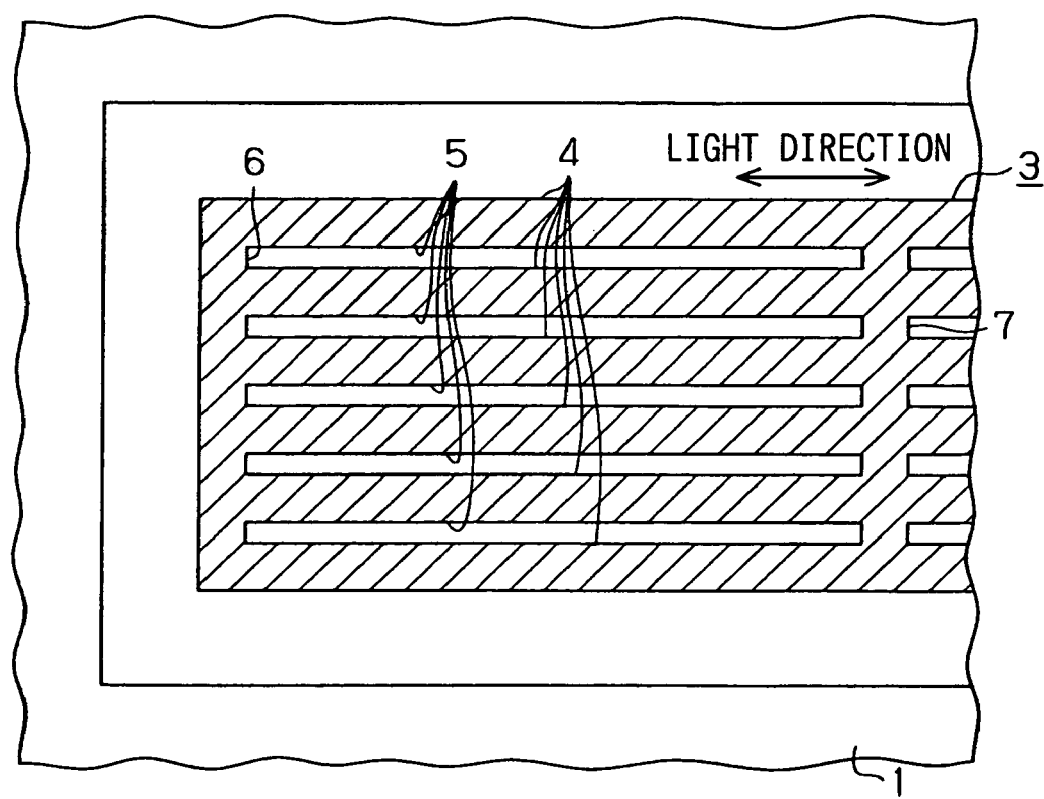
FIG. 3 is a cross sectional view showing the device taken along line III—III in FIG. 2A.

In view of the above problem, as shown in FIGS. 1 to 3, an optical device having an optical waveguide according to a first embodiment of the present invention is provided.

The device includes a silicon substrate 1. The substrate 1 has a base 2. The base 2 extends in a light direction, in which the light wave is transmitted. An optical block 3 transmits the light wave. Thus, the optical block 3 extends in parallel to the light direction. Multiple columns 4 are formed on the base 2 of the silicon substrate 1. The columns 4 are made of silicon oxide, and have a rectangular planer shape. The upper portions, i.e., the top of the columns 4 are bonded together. Further, the lower portions, i.e., the bottoms of the columns 4 are also bonded together. Specifically, the columns 4 include multiple cavities 5. Each cavity 5 has a width, which becomes wider as it goes to the bottom of the column 4. The columns 4 are disposed to stand on the base 2. Therefore, the cross section of the cavity 5 has almost triangle shape, so that the width of the bottom of the cavity becomes larger, and the top of the cavity is sharply pointed. The width of the column 4 is defined as W1, and the width of the cavity 5 is defined as W2. The ratio between W1 and W2 becomes smaller as it goes to the bottom of the cavity 5.

Here, average refraction index of the optical block 3 is determined by the ratio of refraction indexes between the $SiO_2$ layer having a refraction index of 1.46 and the cavity having the refraction index of 1.0. Thus, the average refraction index at the upper portion of the optical block 3 is about 1.46, which is the same as the $SiO_2$ film. As it goes to the lower portion, the average refraction index of the optical block 3 becomes lower. As shown in FIG. 2B, the average refraction index N at the upper portion of the optical block 3 has the maximum refraction index defined as $N_{MAX}$, and the average refraction index defined as N becomes lower gradually as it goes to the lower portion. Then, the average refraction index N at the lower portion of the optical block 3 has the minimum refraction index defined as $N_{MIN}$. Here, the difference between the maximum refraction index $N_{MAX}$ and the minimum refraction index $N_{MIN}$ is expressed as $(1-N_{MIN}/N_{MAX})$, which is equal to or larger than 4%. In this case, the difference between the maximum refraction index $N_{MAX}$ and the minimum refraction index $N_{MIN}$ is in a range between 4% and 5%.

This refraction index difference provides that the upper portion of the optical block 3 becomes a core layer and the lower portion of the block 3 becomes a cladding layer. Thus, the light wave is trapped in a trap region 60 in the vertical direction and in the horizontal direction so that the light wave transmits through the trap region 60 as the core layer. When the light wave during transmitting in the trap region 60 is directed toward the lower portion of the block 3, the light wave turns gradually its transmitting direction from downward to upward. Thus, the light wave is trapped in the trap region 60.

Specifically, the ratio of W1/W2 becomes smaller as it goes to the lower portion of the block 3. The average refraction index N of the column 4 in the vertical direction becomes larger as it goes to the upper portion of the block 3. Therefore, the light wave is trapped in the trap region 60. Further, as the height of the column 4 becomes higher, the thickness of the trap region 60 as the core layer becomes larger. Accordingly, the connection loss between the light source and the device becomes smaller. Specifically, when the difference between the maximum refraction index $N_{MAX}$ and the minimum refraction index $N_{MIN}$ is equal to or larger than 4%, the light wave is effectively trapped in the trap region 60.

In FIG. 1, an interval between two neighboring columns 4 is defined as P1. Therefore, the periodic interval of boundary between the air layer and the $SiO_2$ layer is 1.82 μm. Thus, the interval P1 is set to be 1.82 μm. On the basis of physical law, it is preferred that the interval P1 becomes much smaller. For example, preferably, the interval P1 is equal to or smaller than the wavelength of the light. This is because the light may reflect diffusely when the interval P1 is larger. However, when the interval P1 is smaller, the light does not reflect diffusely. The light is not affected by the boundary, but affected only by the average refraction index. On the other hand, on the basis of the manufacturing process, it is easily achieved that the interval P1 is in a range between 1.0 μm and 4.5 μm in view of mask patterning accuracy in a dry-etching process and process time in a thermal oxidation process. Here, the optical waveguide is suitably used for the light in a range between visible light and near infra-red light, i.e., the light has wavelength in a range between 0.4 μm and 1.55 μm. Therefore, the interval P1 is set to be in a range between under a wavelength of the light and twelve times of the wavelength of the light. Thus, the interval P1 between two neighboring columns 4 is equal to or smaller than twelve times of the wavelength of the light. Thus, the light is prevented from reflecting diffusely.

As shown in FIG. 3, the device includes the second silicon oxide column 6 as a silicon oxide sidewall, which connects between the columns 4, and is disposed on an end of the block 3. The second silicon oxide column 6 is disposed to stand on the substrate 1. The second column 6 reinforces the column 4. Further, the second column 6 provides a flat surface on the end of the block 3 so that the column 6 protects the light from surface refraction. Further, the device includes the third column 7 as an intermediate silicon oxide wall, which is disposed between both ends of the block 3. The third column 7 is disposed in the middle of the block 3 in the extending direction of the column 4. The third column 7 connects among the column 4, and disposed to stand on the substrate 1. Thus, the second column 6 and the third column 7 connect the columns 4 so that the columns 4 are reinforced by the second and the third columns 6, 7.

Figure 4:
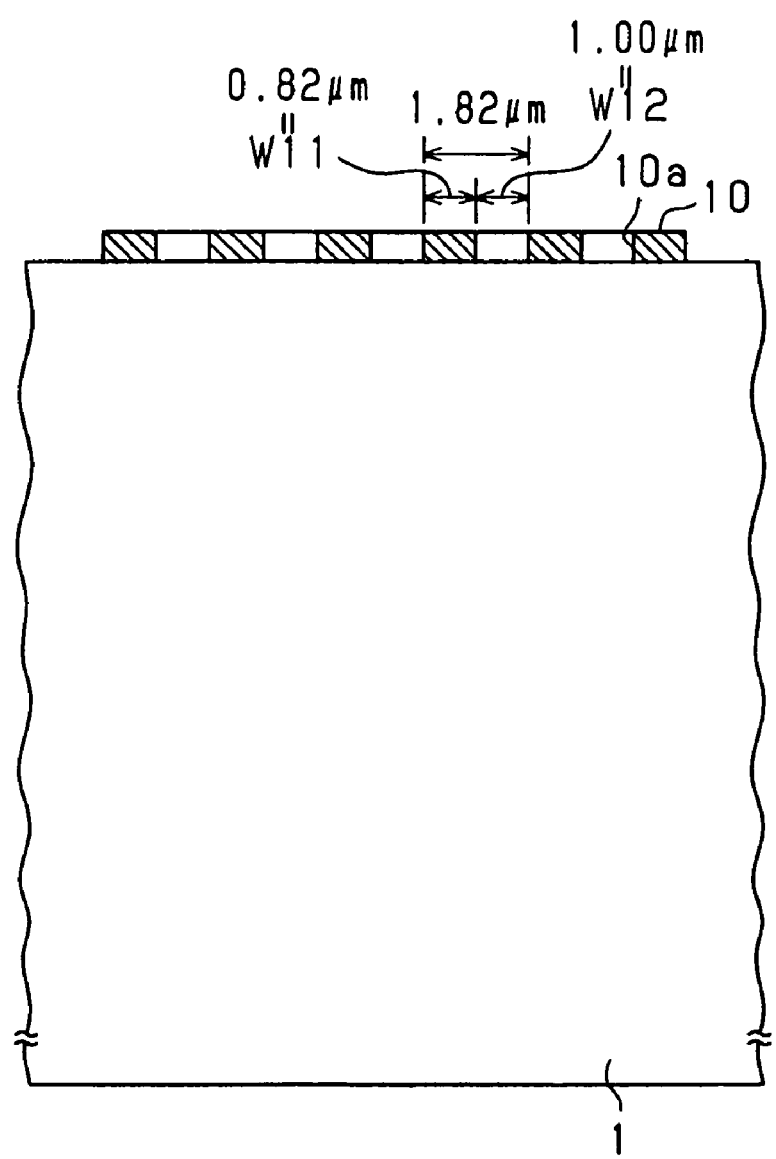
FIG. 4 is a cross sectional view explaining a method of manufacturing the device according to the first embodiment.

The device is manufactured as follows. Firstly, as shown in FIG. 4, an etching mask 10 having a predetermined pattern is formed on the substrate 1. The mask 10 is made of, for example, photo resist or silicon oxide film (i.e., $SiO_2$ film). In this case, to form a periodic trench construction, the mask has an opening 10a. The width of the opening 10a of the mask 10 is defined as W12, and an interval of the opening 10a is defined as W11. The interval W11 of the opening 10a is, for example, 0.82 μm, and the width W12 of the opening 10a is, for example, 1.00 μm. Thus, the ratio of the interval W11 and the width W12 is W11:W12=0.45:0.55.

Figure 5:
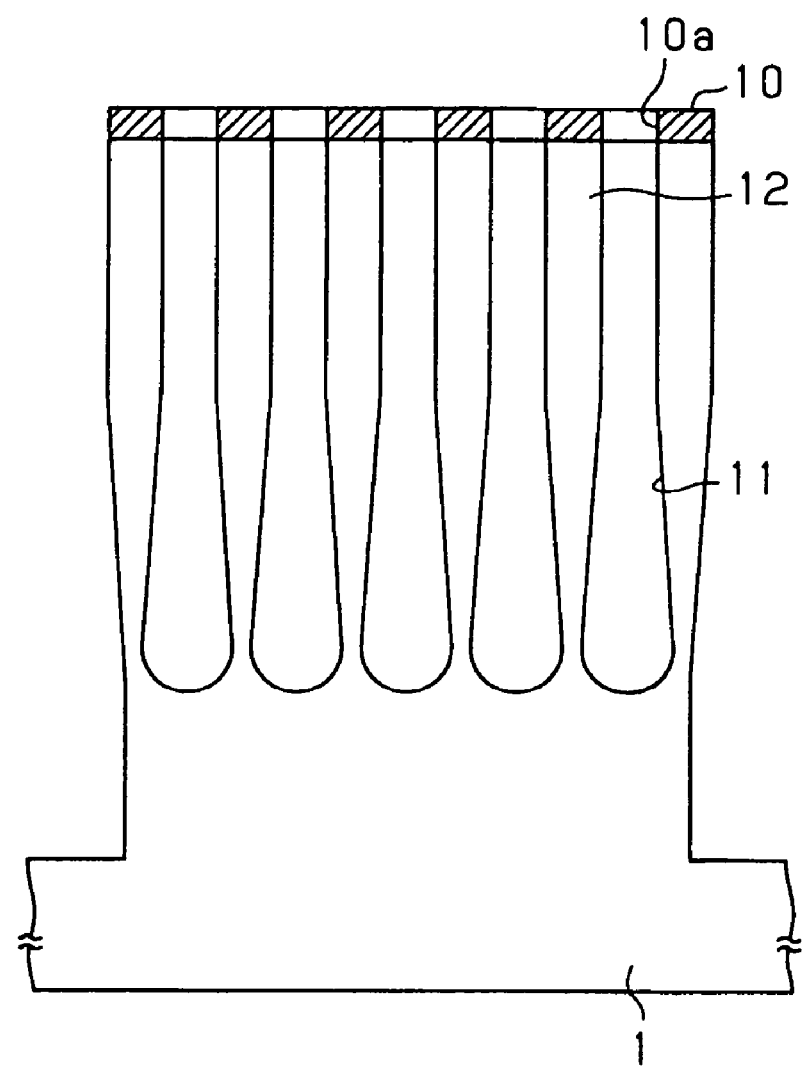
FIG. 5 is a cross sectional view explaining the method of manufacturing the device according to the first embodiment.

The surface of the substrate 1 is etched through the opening 10a of the mask 10 in a dry-etching process, as shown in FIG. 5. Thus, a trench 11 is formed in the substrate 1. The trench 11 has a predetermined shape. At this time, the trench 11 has an inverse tapered cross section. Specifically, the width of the trench 11 becomes larger as it goes to the bottom of the trench 11. Therefore, the trench 11 does not have a rectangular cross section. The sidewall of the trench 11 is a little tilted from a perpendicular line perpendicular to the substrate 1.

Figure 6:
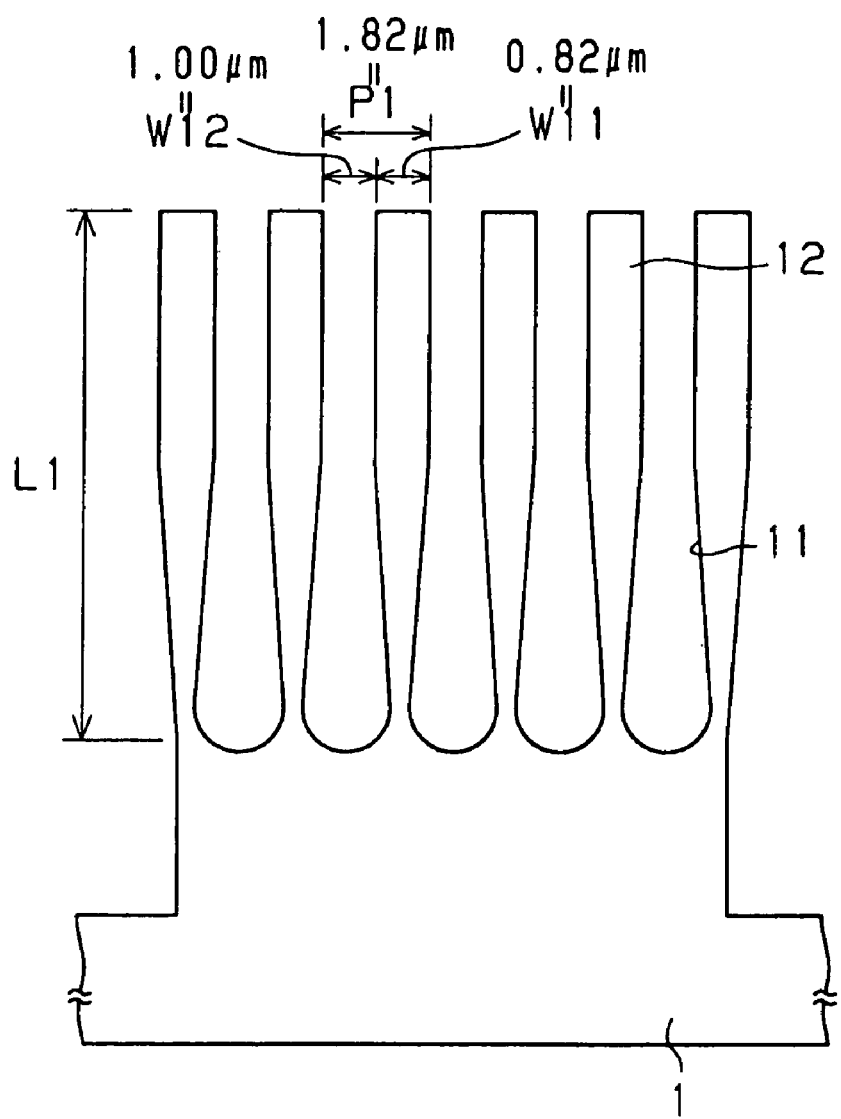
FIG. 6 is a cross sectional view explaining the method of manufacturing the device according to the first embodiment.

Accordingly, in the first process, multiple trenches 11 are formed in the substrate 1. Then, as shown in FIG. 6, the mask 10 is removed. After that, the sidewall of the trench 11 is flattened if necessary. Here, the width W11 of a silicon layer 12 between the trenches 11 at the top of the substrate 1 is, for example, 0.82 μm, and the width W12 of the trench 11 at the top of the substrate 1 is, for example, 1.00 μm. The depth L1 of the trench 11 is, for example, 50 μm.

Then, as shown in FIG. 2A, the thermal oxidation process is performed. The substrate 1 is thermally oxidized in a time when the thickness of an oxide film becomes equal to or larger than 1.82 μm. The silicon layer 12 between the trenches 11 is completely transformed to a $SiO_2$ film. Further, the upper portion of the trench 11 is completely embedded with a thermal oxide film. On the other hand, since the lower portion of the trench 11 has large width, the lower portion of the trench 11 is not completely embedded with the thermal oxide film. Therefore, the cavity 5 is formed in the lower portion of the trench 11. The width of the cavity 5 becomes larger as it goes to the bottom of the trench 11.

Thus, in the second process, the silicon oxide film is formed in the trench 11 by the thermal oxidation method. Further, the silicon layer 12 between the trenches 11 is transformed to the silicon oxide film. Thus, the optical block 3 is formed. The block 3 has the cavity 5. In this case, the width W11 of the silicon layer 12 between the trenches 11 and the width W12 of the trench 11 has a relationship of W11:W12=0.45:0.55 at the upper portion of the trench 11.

As shown in FIG. 3, the mask 10 has a predetermined pattern so that the second column 6 connects among the columns 4. The width of the second column 6 is determined appropriately so that the silicon layer 12 disposed on a second-column-to-be-formed region is transformed to $SiO_2$ film completely after the thermal oxidation process is finished. Thus, the mechanical strength of the block 3 is secured by the second column 6 during the manufacturing process. Further, the third column 7 is formed in the middle of the block 3. The third column 7 as a connection portion has a predetermined width so that the silicon layer 12 disposed on a third-column-to-be-formed region is completely transformed into a $SiO_2$ film in the thermal oxidation process.

Thus, the manufacturing method of the device according to the first embodiment is composed of simple processes. Further, the method provides the device having thick core layer, and has large design degree of freedom of a shape of the device.

Figure 16A:
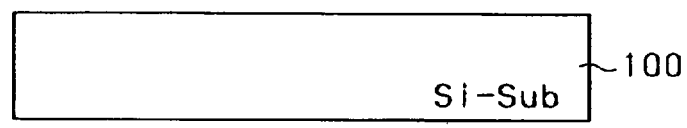
FIGS. 16A to 16C are cross sectional views explaining a method of manufacturing the device according to the comparison of the first embodiment.
Figure 16B:
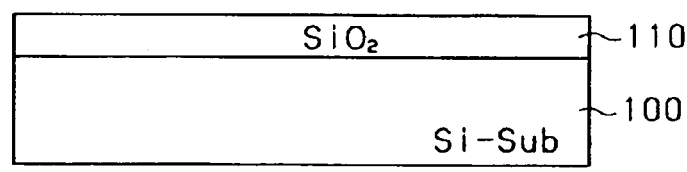
Figure 16C:
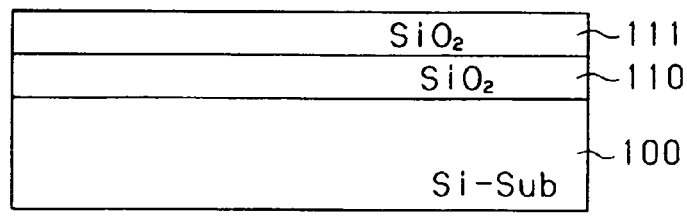
Figure 17A:
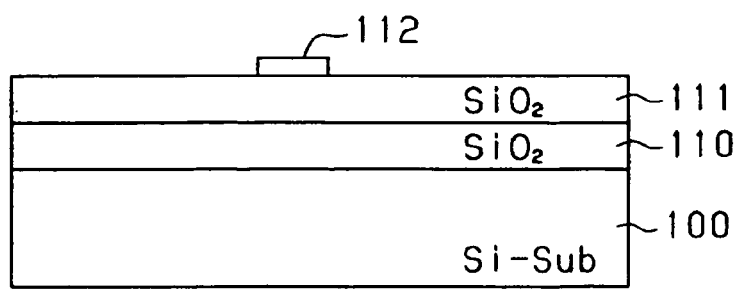
FIGS. 17A to 17D are cross sectional views explaining the method of manufacturing the device according to the comparison of the first embodiment.
Figure 17B:
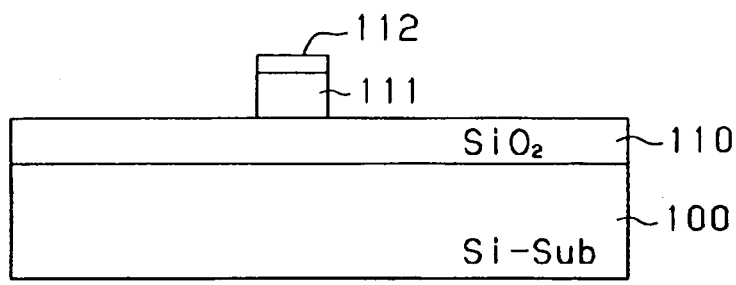
Figure 17C:
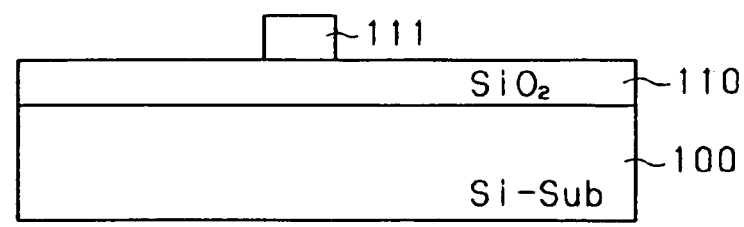
Figure 17D:
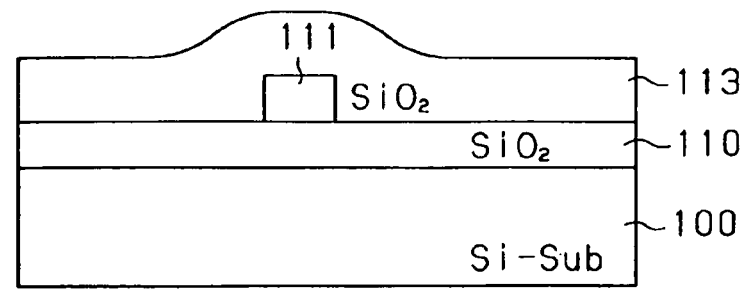

Specifically, in the comparison method shown in FIGS. 16 and 17, the silicon oxide layer 110, 111, 113 is deposited on the substrate 100. Therefore, it is required to deposit the $SiO_2$ layer 110, 111, 113 many times, and to form the mask 112 many times. Therefore, the manufacturing method becomes complicated. Specifically, it is difficult to etch the $SiO_2$ layer 111 having high refraction index. Therefore, the $SiO_2$ layer 111 cannot be etched deeply. Thus, aspect ratio of etching becomes smaller. Further, a sidewall of the $SiO_2$ layer, which is formed by etching, becomes rough. Thus, the thickness of the $SiO_2$ layer 111 cannot be thickened. For example, the thickness of the $SiO_2$ layer 111 is smaller than 10 μm. Therefore, connection loss between the light source and the device becomes larger. Further, because of small aspect ratio, design degree of freedom of the shape of the optical waveguide is reduced. Furthermore, the transmission loss of the light becomes larger.

However, in the first embodiment, the silicon substrate 1 is etched. The silicon substrate is easily etched by the dry-etching method, compared with silicon oxide film. Then, the silicon substrate is thermally oxidized. Specifically, the trench 11 in the silicon substrate 1 can have depth larger than 100 μm, and aspect ratio larger than 10. This silicon etching method is disclosed, for example, in Japanese Patent Application Publication No. 2000-299310. Thus, the core layer having the thickness equal to or larger than a few dozen μm is easily formed. Therefore, the connection loss between the light source and the device is reduced. Further, design degree of freedom of the optical waveguide is increased. Furthermore, the sidewall of the trench 11 can be flattened. After that, the silicon substrate 1 is thermally oxidized, so that the flat sidewall of the optical waveguide is obtained. Thus, the transmission loss at the sidewall is reduced. This flattening method is disclosed in, for example, Japanese Patent Application Publication No. 2002-231945.

Figure 7:
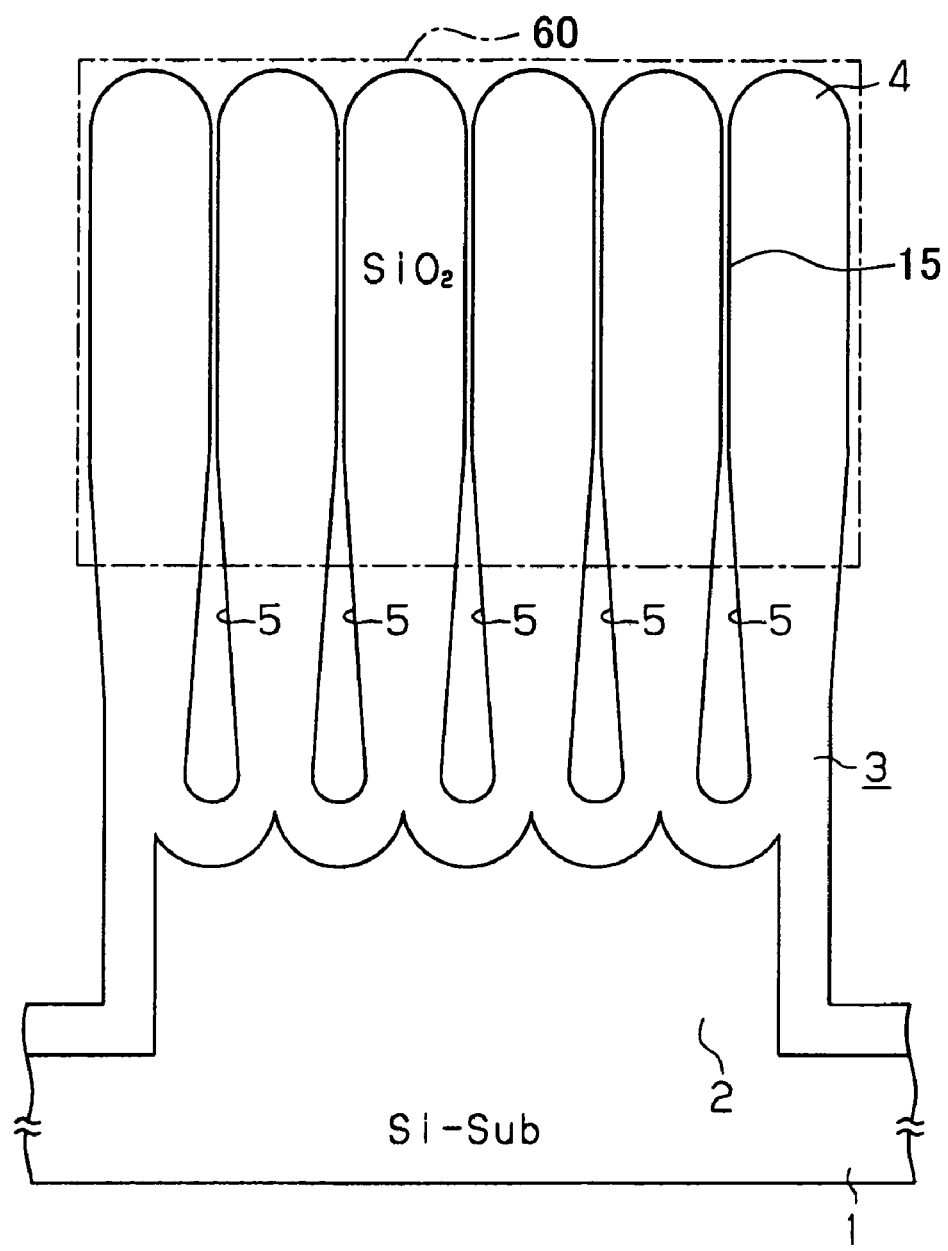
FIG. 7 is a cross sectional view showing an optical device according to a modification of the first embodiment.

Although the cavity 5 shown in FIG. 2A is disposed inside of the block 3 completely, the cavity 5 can have a slot 15 between the columns 4, as shown in FIG. 7. Thus, the cavity 5 is connected to outside of the block 3 through the slot 15.

Second Embodiment

Figure 8A:
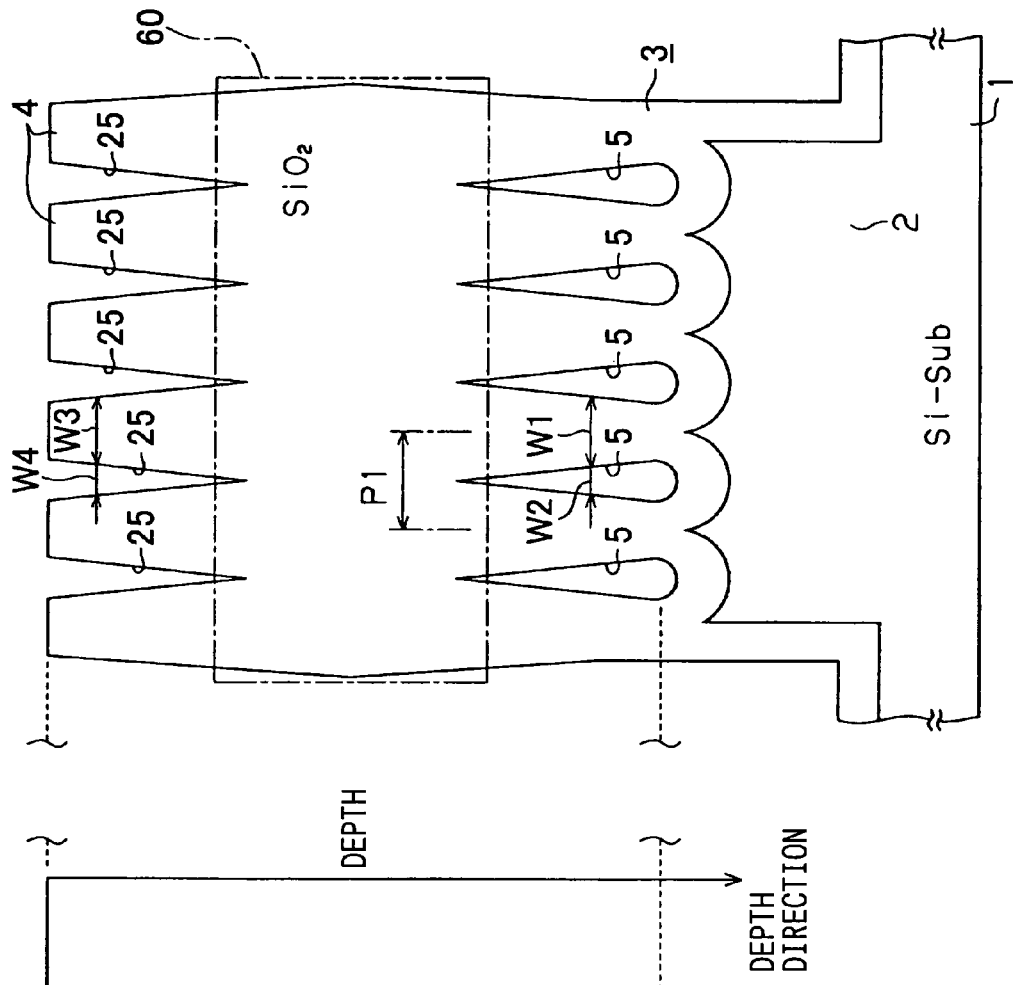
FIG. 8A is a cross sectional view showing an optical device according to a second embodiment of the present invention.

FIG. 8A shows an optical device having an optical waveguide according to a second embodiment of the present invention. In the device, the trap region 60 as a core layer is not disposed in the upper portion of the optical block 20 but in the middle portion of the block 3 in the vertical direction. Specifically, the block 3 is formed on the base 2 of the substrate 1. Multiple columns 4 are disposed on the substrate 1. Each column 4 has a rectangular plan shape, and is made of silicon oxide. The column 4 has a predetermined height in the vertical direction. The concavity 5 is formed in the lower portion of the block 3, and another cavity 25 as the second cavity is formed in the upper portion of the block 3. The width of the second cavity 25 becomes larger as it goes to the top of the block 3. The width of the cavity 5 becomes larger as it goes to the bottom of the block 3. The width of the second cavity 25 is defined as W4, and the width of the upper portion of the column 4 is defined as W3. The ratio of W3/W4 becomes smaller as it goes to the top of the block 3. The ratio of W1/W2 becomes smaller as it goes to the bottom of the block 3.

Figure 8B:
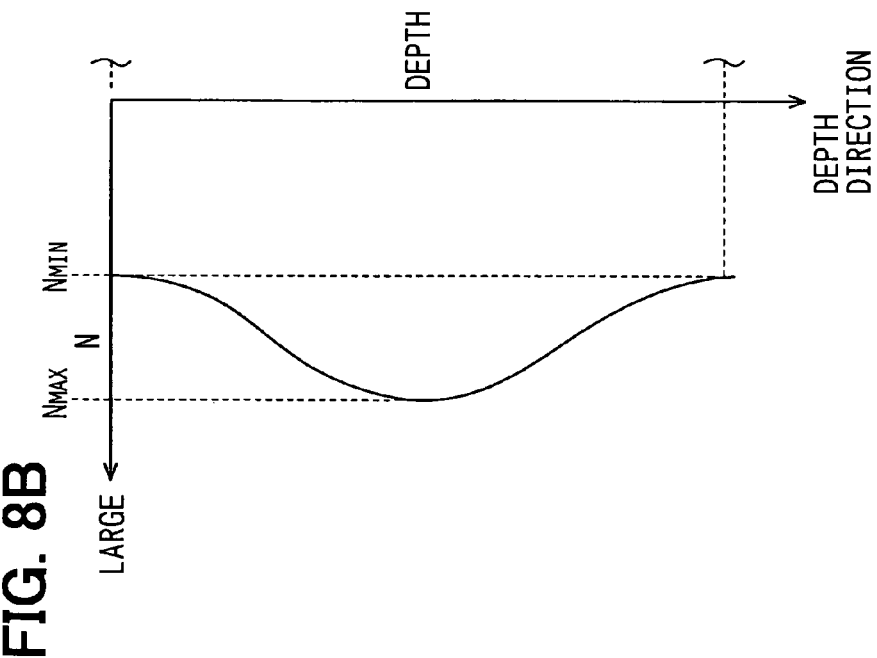
FIG. 8B is a graph showing a depth profile of an average refraction index in the device according to the second embodiment.

Accordingly, the average refraction index N has the maximum index in the middle of the block 3, and the index N becomes smaller as it goes to the top or the bottom of the block 3. Thus, when the light wave transmits in the block 3 in the horizontal direction of the device, the light wave is trapped in middle of the block 3. The block 3 shown in FIG. 1 is asymmetric so that the light wave is totally reflected at the boundary between the $SiO_2$ layer and the air regarding to the upper portion of the block 3. However, the block 3 shown in FIG. 8 is symmetric in the vertical direction so that the light wave transmitting to the upper portion of the block 3 gradually changes its transmitting direction from the upper direction to the lower direction since the average refraction index N becomes lower as it goes to the upper portion of the block 3. Similarly, the light wave gradually changes its direction as it goes to the bottom of the block 3.

Thus, the average refraction index N gradually becomes smaller as it goes from the middle to the top or the bottom of the block 3, so that the light wave is trapped in the middle portion of the block 3. Therefore, the trap region 60 as the core layer can be thickened by increasing the height of the column 4. Thus, the connection loss of the device becomes smaller.

Further, the interval P1 of the columns 4 is smaller than twelve times of the wavelength of the light wave. Therefore, the diffuse reflection is effectively reduced. Furthermore, the index difference between the maximum average refraction index $N_{MAX}$ and the minimum average refraction index $N_{MIN}$ is equal to or larger than 4%. Here, the maximum average refraction index $N_{MAX}$ is defined at the middle portion of the block 3, which is disposed at a connection portion of neighboring columns 4. The minimum average refraction index $N_{MIN}$ is defined at a portion, of which the width of the cavity 5, 25 is largest. Thus, the difference $(1-N_{MIN}/N_{MAX})$ is equal to or larger than 4%. In this case, the light is effectively trapped in the block 3.

Figure 11A:
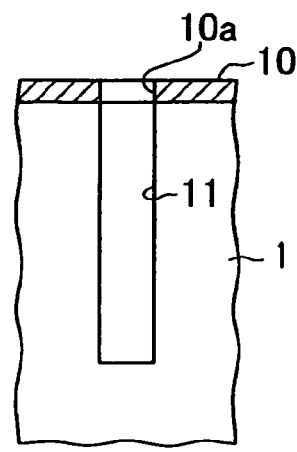
FIGS. 11A to 11C are cross sectional views explaining the method of manufacturing the device according to the second embodiment.
Figure 11B:
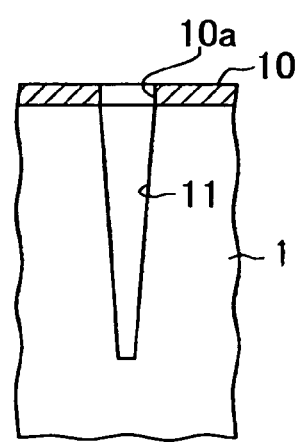
Figure 11C:
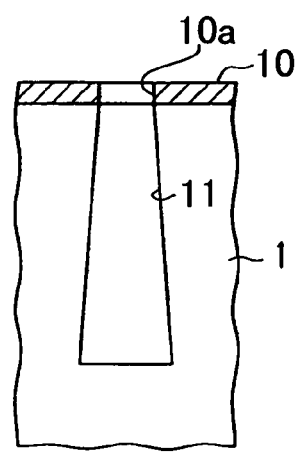

Regarding to the method of manufacturing the device, by changing etching conditions such as pressure of gases and acceleration voltage of ions in the dry-etching process, the cross section of the trench 11 can be a perpendicular shape as shown in FIG. 11A, a tapered shape as shown in FIG. 11B, or an inverse tapered shape shown in FIG. 11C.

Figure 9:
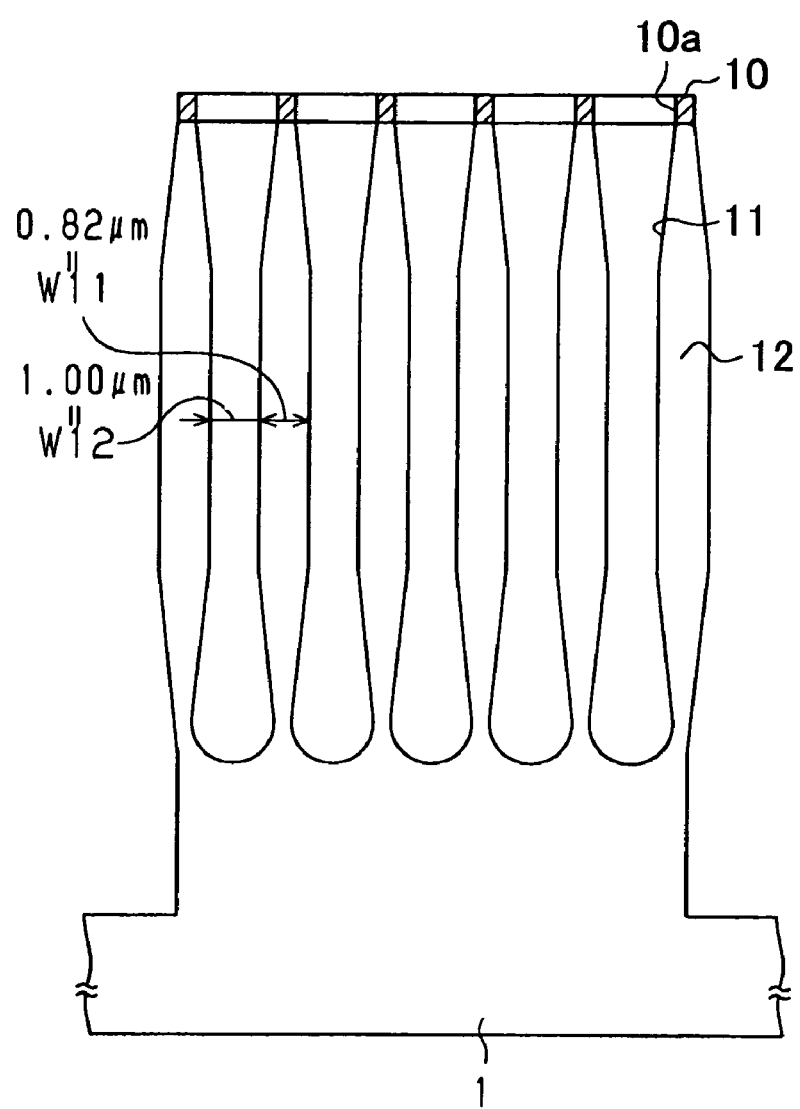
FIG. 9 is a cross sectional view explaining a method of manufacturing the device according to the second embodiment.

For example, the etching process is divided into two steps. In the first step, the trench 11 is formed to be the tapered shape. In the second step, the trench 11 is formed to be the inverse tapered shape. In this case, as shown in FIG. 9, the substrate 1 is etched from the opening 10a of the mask 10 so that the trench 11 has a predetermined shape, in which the middle portion of the trench 11 has the minimum width, and the top and the bottom of the trench 11 has the maximum width. Here, the minimum width of the trench 11 at the middle portion of the trench 11 is defined as W12, and the width of the column 4 at the middle portion of the trench 11 is defined as W11. In this case, the width W11 of the Si layer 12 is, for example, 0.82 μm, and the width W12 is, for example, 1.00 μm. Thus, the ratio of W11/W12 is W11: W12=0.45:0.55.

Figure 10:
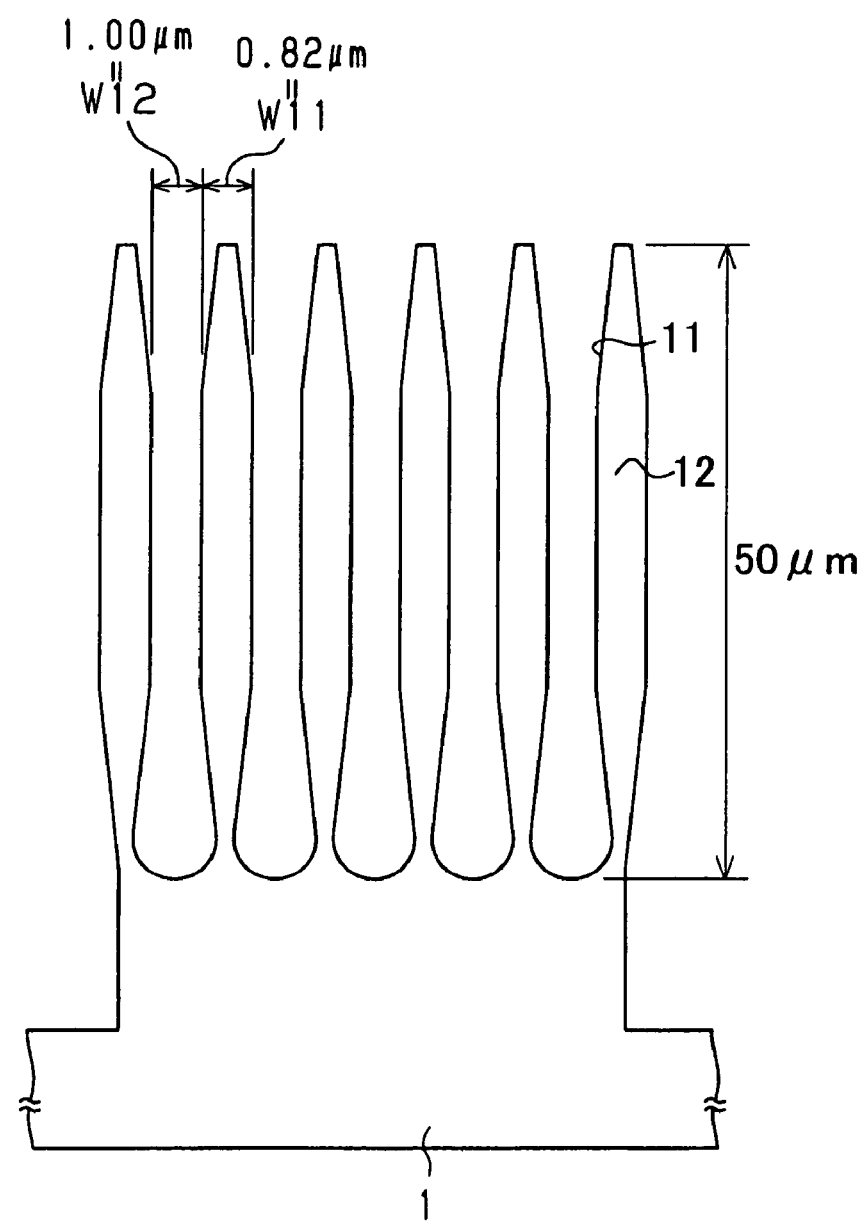
FIG. 10 is a cross sectional view explaining the method of manufacturing the device according to the second embodiment.

In the first process as the etching process, multiple trenches 11 are formed in the substrate 1 to have the minimum width at the middle portion of the trench 11. Further, as shown in FIG. 10, the mask 10 is removed from the substrate 1. Then, the sidewall of the trench 11 is flattened if necessary. After that, the substrate 1 is thermally oxidized. In the thermal oxidation process, the process time is determined to be equal to or longer than a time when the trench 11 at the middle portion of the trench 11 is embedded with the SiO$_2$ layer. Therefore, the SiO$_2$ layer is formed to have the thickness equal to or larger than 1.82 μm, when the width W11 of the silicon layer 12 is 0.82 μm and the width W12 of the trench 11 is 1.00 μm.

Thus, in the second process, the silicon oxide is formed in the trench 11 by the thermal oxidation process. Further, the silicon layer 12 is converted to the silicon oxide layer. Thus, The optical block 3 having the first and the second cavities 5, 25 is formed. The block 3 is integrated with the substrate 1. The trench 11 at the middle portion of the block 3 is embedded with the SiO$_2$ layer so that the columns 4 are connected at the middle portion of the block 3. Further, the upper portion of the trench 11 provides the second cavity 25, and the lower portion of the trench 11 provides the first cavity 5.

Figure 12:
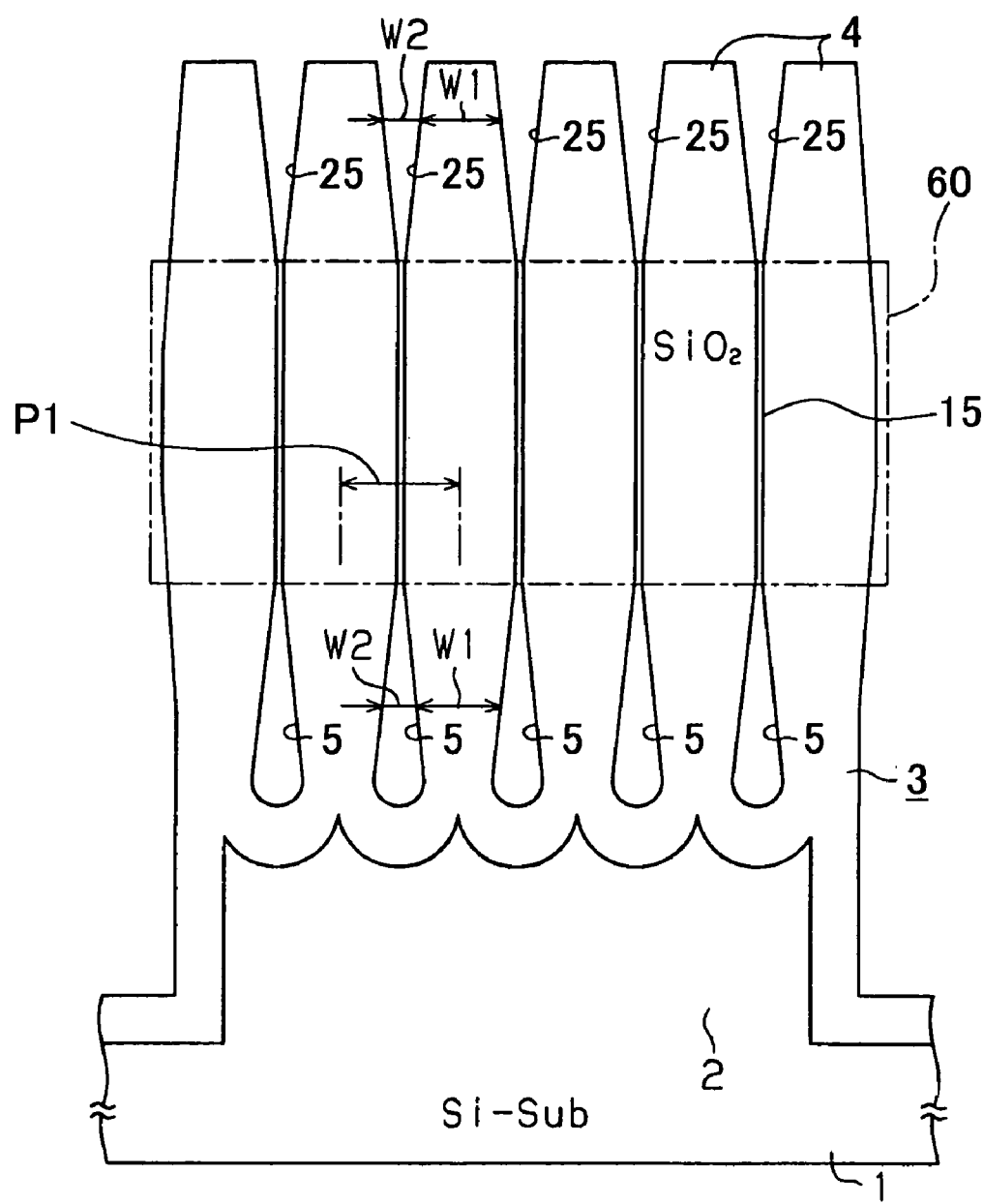
FIG. 12 is a cross sectional view showing an optical device according to a modification of the second embodiment.

Although the middle portion of the trench 11 is completely embedded with the SiO$_2$ layer in FIG. 8, the middle portion of the trench 11 can have the slot 15, as shown in FIG. 12. Thus, the block 3 has the slot 15 at the middle portion of the block 3. The slot 15 is connected to the cavities 5, 25. In this case, the thermal oxidation time in the thermal oxidation process is appropriately determined so that the trench 11 has the slot 15.

Third Embodiment

Figure 13:
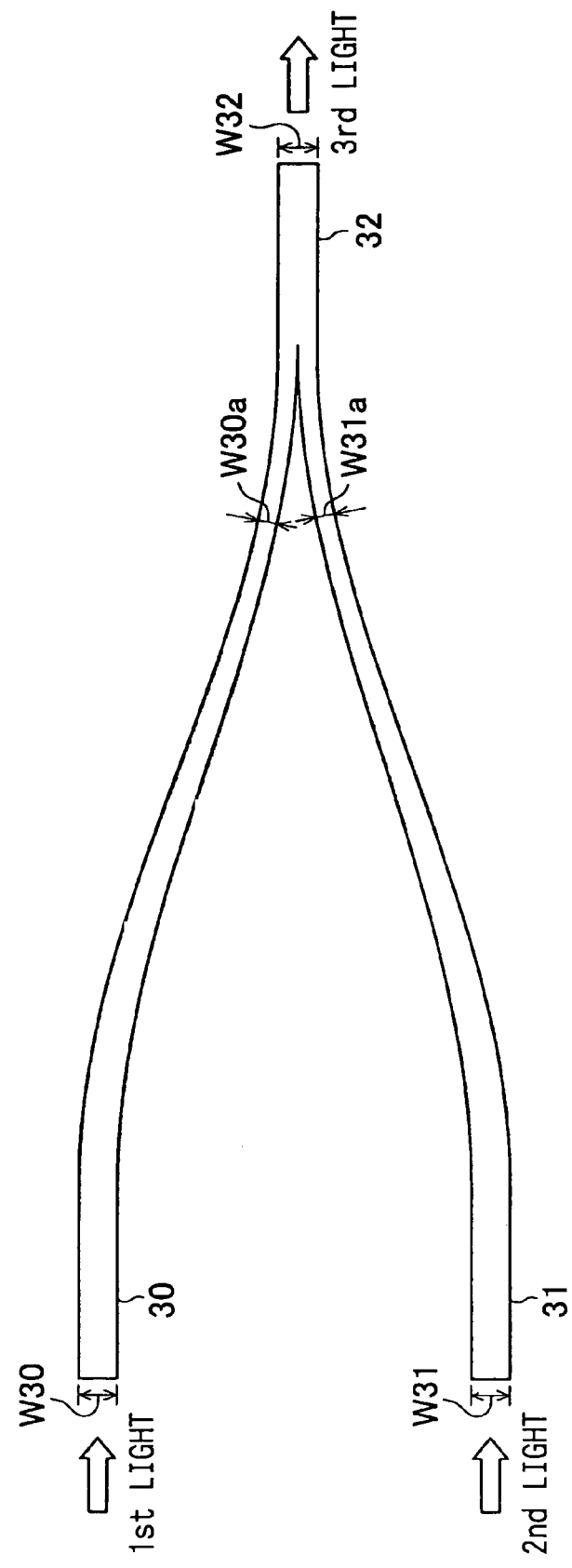
FIG. 13 is a plan view showing an optical waveguide in an optical device according to a third embodiment of the present invention.

FIG. 13 shows an optical waveguide in an optical device according to a third embodiment of the present invention. In general, the optical waveguide is composed of multiple passages. For example, one passage is divided into multiple passages so that the light wave is divided into multiple light waves. Further, multiple passages are concentrated into one passage so that multiple light waves are concentrated into one light wave.

In FIG. 13, two light waves are introduced into two inlets of the optical guide, and then, the lights are synthesized into one light wave. Then, the light is outputted from the outlet of the guide. In this case, the first light and the second light are introduced into the first and the second passages 30, 31, and then the light is transmitted in the third passage 32. The width of the first passage 30 is defined as W30, the width of the second passage 31 is defined as W31, and the width of the third passage 32 is defined as W32. Here, the width W30 of the first passage 30 becomes smaller as it goes to the third passage 32, and the width W31 of the second passage 31 becomes smaller as it goes to the third passage 32. Further, the width W30 of the first passage 30 is equal to the width W31 of the second passage 31. To equalize the width W32 of the third passage 32 to the width W30, W31 of the first or the second passages 30, 31, each width W30a, W31a of the first and the second passages 30, 31 is gradually narrowed. Thus, the width W30, W31 of the inlet of the first or the second passage 30, 31 is equal to the width W32 of the outlet of the third passage 32.

Figure 14:
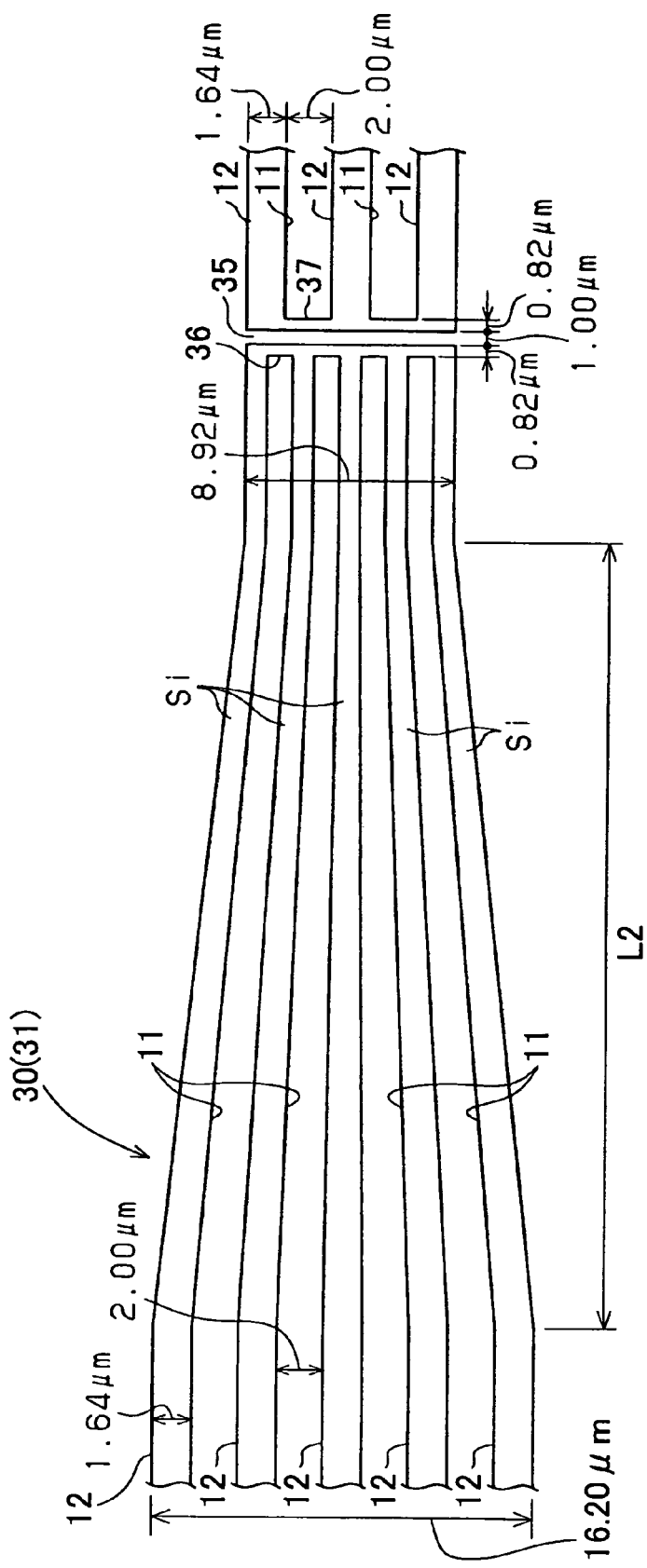
FIG. 14 is a plan view explaining a method of manufacturing the device according to the third embodiment.

The method of manufacturing the device shown in FIG. 13 is described as follows. As shown in FIG. 14, the substrate 1 is processed to have a predetermined shape of the waveguide pattern for decreasing the width of the waveguide continuously.

In FIG. 14, the block 3 is composed of five silicon layers 12. Firstly, each silicon layer 12 has the width of 1.64 μm. The width of the trench 11 is 2.00 μm. Thus, the ratio of width between the silicon layer 12 and the trench 11 is 0.45:0.55. Therefore, in the later thermal oxidation process, the thermal oxidation time is set to be equal to or longer than a time, with which the silicon oxide layer having the thickness of 3.64 μm is formed, so that the trench 11 is embedded with silicon oxide, and the silicon layer 12 is converted from silicon to silicon oxide. Thus, the silicon oxide block 3 is formed. Here, the width of the trench 11 becomes wider as it goes to the bottom of the trench 11 so that the cavity 5 is formed in the block 3 after the thermal oxidation process. In a range defined as L2, the width of the silicon layer 12 and the width of the trench 11 are decreased gradually. Specifically, the total width of the inlet side of the block 3 is 16.20 μm. The total width of the outlet side of the block 3 is 8.92 μm. Thus, in the range L2, the width of the waveguide is decreased to about 55%.

The waveguide has a slot 35. The slot 35 has the width of 1.00 μm. The first or the second passage 30, 31 is connected to the third passage 32 through the slot 35. In this case, one end of the passage 30, 31 has a silicon layer portion 36, and one end of the third passage 32 also has another silicon layer portion 37. At the one end of the third passage, three silicon layers 12 and two trenches 11 are formed. Each trench has the width of 2.00 μm, and the width of the silicon layer 12 is 1.64 μm. Although the initial width of the silicon layer 12 and the initial width of the trench 11 in the third passage 32 are the same as those in the first and the second passages 30, 31, the number of the silicon layers in the third passage 32 is smaller than that of the first and the second passages 30, 31. Thus, the total width of the third passage 32 is reduced, compared with that of the first and the second passages 30, 31. Thus, the first and the second passages are merged to the third passage 32 continuously and gradually. Here, the connection portion between the first or the second passage 30, 31 and the third passage 32 is composed of the silicon layer portions 36, 37 and the slot 35. The silicon layer portion has the width of 0.82 μm, and the slot 35 has the width of 1.00 μm. In the later thermal oxidation process, the slot 35 is embedded with silicon oxide, and the silicon layer portions 36, 37 are converted to silicon oxide. Thus, the connection portion becomes silicon oxide block as a whole. Thus, the first passage 30 is bonded to one end of the third passage 32, and the second passage 31 is bonded to the other end of the third passage 32.

Then, the one end of the third passage 32 and the other end of the third passage 32 are connected at a predetermined joint portion. Thus, the waveguide shown in FIG. 13 is formed. In this case, two passages 30, 31 are bonded to the third passage 32 without increasing connection loss.

Such changes and modifications are to be understood as being within the scope of the present invention as defined by the appended claims.

What is claimed is:

1. An optical device comprising:
a silicon substrate;
a plurality of silicon oxide columns having a rectangular plan shape; and
a cavity disposed between the columns, wherein
each column has a lower portion disposed on the substrate,
each column has a width defined as W1,
the cavity has a width defined as W2, and
a ratio of W1/W2 becomes smaller as it goes to the lower portion of the column.

2. The device according to claim 1, wherein
each column has an upper portion, which is opposite to the lower portion of the column,
the upper portions of the columns are connected together,
the cavity is disposed below the upper portion, and
the width of the cavity becomes larger as it goes to the lower portion of the column.

3. The device according to claim 1, wherein
the columns have an interval between two neighboring columns, and
the interval of the columns is equal to or smaller than twelve times of wavelength of light, which is to be transmitted through the columns.

4. The device according to claim 1, wherein
the columns and the cavity provide an optical waveguide for transmitting light therethrough, and
the optical waveguide has a maximum average refraction index and a minimum average refraction index so that a difference between the maximum average refraction index and the minimum average refraction index is equal to or larger than 4% of the maximum average refraction index.

5. The device according to claim 4, wherein
the optical waveguide transmits light in a light transmitting direction,
the columns extend in the light transmitting direction, and
the cavity extends in the light transmitting direction.

6. The device according to claim 5, wherein
the optical waveguide includes both ends in the light transmitting direction, and
each end of the optical waveguide is provided by a silicon oxide wall so that the columns are connected by the silicon oxide wall.

7. The device according to claim 6, wherein
the cavity is disposed inside of the optical waveguide so that the cavity is surrounded with the substrate, the columns and the silicon oxide wall.

8. The device according to claim 6, wherein
the optical waveguide further includes an intermediate silicon oxide wall,
the intermediate silicon oxide wall is disposed between both ends of the optical waveguide, and
the columns are connected by the intermediate silicon oxide wall.

9. The device according to claim 5, wherein
the cavity has a triangular cross section in a direction perpendicular to the light transmitting direction so that the width of the cavity becomes larger as it goes to the lower portion of the column.

10. The device according to claim 5, wherein
the optical waveguide has a width in a direction perpendicular to the light transmitting direction,
the width of the column, the width of the cavity are defined in the direction perpendicular to the light transmitting direction, and
the width of the optical waveguide becomes smaller as it goes in parallel to the light transmitting direction.

11. The device according to claim 5, wherein
the optical waveguide has a width in a direction perpendicular to the light transmitting direction,
the width of the column, the width of the cavity are defined in the direction perpendicular to the light transmitting direction, and
the width of the optical waveguide becomes larger as it goes in parallel to the light transmitting direction.

12. The device according to claim 1, further comprising:
a second cavity disposed between the columns, wherein
the cavity is disposed in the lower portion of the columns,
the second cavity is disposed in an upper portion of the columns,
the width defined as W1 is a width of the lower portion of the column,
each column has a second width of the upper portion defined as W3,
the second cavity has a width defined as W4, and
a ratio of W3/W4 becomes smaller as it goes to the upper portion of the column.

13. The device according to claim 12, wherein
each column has a middle portion,
the middle portions of the columns are connected,
the cavity is disposed below the middle portions of the columns,
the second cavity is disposed above the middle portions of the columns,
the width of the cavity becomes larger as it goes to the lower portion of the column, and
the second cavity has a second width, which becomes larger as it goes to the upper portion of the column.

14. The device according to claim 12, wherein
the columns have an interval between two neighboring columns, and
the interval of the columns is equal to or smaller than twelve times of wavelength of light, which is to be transmitted into the columns.

15. The device according to claim 12, wherein
the columns, the cavity and the second cavity provide an optical waveguide for transmitting light therein, and
the optical waveguide has a maximum average refraction index and a minimum average refraction index so that a difference between the maximum average refraction index and the minimum average refraction index is equal to or larger than 4% of the maximum average refraction index.

16. The device according to claim 15, wherein
the optical waveguide transmits light in a light transmitting direction,
the columns extend in the light transmitting direction, and
the cavity and the second cavity extend in the light transmitting direction.

17. The device according to claim 16, wherein
the optical waveguide includes both ends in the light transmitting direction, and each end of the optical waveguide is provided by a silicon oxide wall so that the columns are connected by the silicon oxide wall.

18. The device according to claim 17, wherein
the cavity and the second cavity are disposed inside of the optical waveguide so that the cavity and the second cavity are surrounded with the substrate, the columns and the silicon oxide wall.

19. The device according to claim 17, wherein
the optical waveguide further includes an intermediate silicon oxide wall,
the intermediate silicon oxide wall is disposed between both ends of the optical waveguide, and
the columns are connected by the intermediate silicon oxide wall.

20. The device according to claim 16, wherein
the cavity has a triangular cross section so that the width of the cavity becomes larger as it goes to the lower portion of the column, and
the second cavity has an inverted triangular cross section so that the second width of the second cavity becomes larger as it goes to the upper portion of the column.

21. The device according to claim 16, wherein
the optical waveguide has a width in a direction perpendicular to the light transmitting direction,
the width and the second width of the column, the width of the cavity, and the second width of the second cavity are defined in the direction perpendicular to the light transmitting direction, and
the width of the optical waveguide becomes smaller as it goes in parallel to the light transmitting direction.

22. The device according to claim 16, wherein
the optical waveguide has a width in a direction perpendicular to the light transmitting direction,
the width and the second width of the column, the width of the cavity, and the second width of the second cavity are defined in the direction perpendicular to the light transmitting direction, and
the width of the optical waveguide becomes larger as it goes in parallel to the light transmitting direction.

23. A method for manufacturing an optical device comprising the steps of:
forming a plurality of trenches on a surface of a silicon substrate by a trench etching method in such a manner that each trench has a width, which becomes larger as it goes to an opposite surface of the substrate, wherein the opposite surface of the substrate is opposite to the surface of the substrate; and
thermally oxidizing the silicon substrate so that the trenches are embedded with silicon oxide, and that a silicon layer disposed between two neighboring trenches is converted to a silicon oxide layer, wherein
in the step of thermally oxidizing the silicon substrate, the silicon oxide layer provides a silicon oxide column having a lower portion connected to the substrate,
in the step of thermally oxidizing the silicon substrate, a cavity is formed between two neighboring columns in the lower portion of the column, and
the cavity has a width, which becomes larger as it goes to the lower portion of the column.

24. The method according to claim 23, wherein
in the step of forming the trenches, each trench has a width defined as $W12$,
in the step of forming the trenches, the silicon layer disposed between two neighboring trenches has a width defined as $W11$, and
a ratio of $W11/W12$ at the surface of the substrate is $W11:W12=0.45:0.55$.

25. A method for manufacturing an optical device comprising the steps of:
forming a plurality of trenches on a surface of a silicon substrate by a trench etching method in such a manner that each trench has a minimum width and a maximum width, wherein the minimum width of the trench is provided at a middle portion of the trench, and the maximum width of the trench is provided at a bottom of the trench and provided at a top of the trench; and
thermally oxidizing the silicon substrate so that the trenches are embedded with silicon oxide, and that a silicon layer disposed between two neighboring trenches is converted to a silicon oxide layer, wherein
in the step of thermally oxidizing the silicon substrate, the silicon oxide layer provides a silicon oxide column having a lower portion connected to the substrate,
in the step of thermally oxidizing the silicon substrate, a first cavity is formed between two neighboring columns in the lower portion of the column, and a second cavity is formed between two neighboring columns in an upper portion of the column,
the first cavity has a first width, which becomes larger as it goes to the lower portion of the column, and
the second cavity has a second width, which becomes larger as it goes to the upper portion of the column.

26. The method according to claim 25, wherein
the step of forming the trenches includes a first process and a second process,
in the first process, the trench is formed to have a tapered shape in a vertical direction of the substrate so that the maximum width of the trench is provided at the top of the trench, and
in the second process, the trench is formed to have an inverted tapered shape in the vertical direction of the substrate so that the maximum width of the trench is provided at the bottom of the trench.

27. The method according to claim 25, wherein
in the step of forming the trenches, the minimum width of the trench is defined as $W12$, and the silicon layer disposed between two neighboring trenches has a width at the middle portion of the trench defined as $W11$,
a ratio of $W11/W12$ at the middle portion of the trench is $W11:W12=0.45:0.55$.

* * * * *